(12) United States Patent
Nissel

(10) Patent No.: US 6,406,285 B1
(45) Date of Patent: *Jun. 18, 2002

(54) APPARATUS FOR MEASURING AND OF CONTROLLING THE GAP BETWEEN POLYMER SHEET COOLING ROLLS

(75) Inventor: Frank R. Nissel, Ambler, PA (US)

(73) Assignee: Welex Incorporated, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,483

(22) Filed: Oct. 21, 1999

(51) Int. Cl.$^7$ ................................. B29C 47/16
(52) U.S. Cl. .................. 425/141; 425/150; 425/367
(58) Field of Search ................. 425/141, 150, 425/172, 367, 327

(56) References Cited

U.S. PATENT DOCUMENTS

| | | | | |
|---|---|---|---|---|
| 3,809,907 A | * | 5/1974 | Schuller et al. | 250/219 TH |
| 3,883,704 A | * | 5/1975 | Barney | 200/5 EB |
| 3,918,865 A | * | 11/1975 | Nissel | 425/131.1 |
| 3,940,221 A | * | 2/1976 | Nissel | 425/141 |
| 3,959,431 A | * | 5/1976 | Nissel | 264/171 |
| 4,533,510 A | * | 8/1985 | Nissel | 264/171 |
| 5,466,403 A | * | 11/1995 | Nissel | 264/39 |

* cited by examiner

Primary Examiner—Nam Nguyen
Assistant Examiner—Joseph S Del Sole
(74) Attorney, Agent, or Firm—Schnader Harrison Segal & Lewis LLP

(57) ABSTRACT

An apparatus for heating and extruding a polymeric sheet having a predetermined thickness and introducing it into and through a gap between cooling rolls, measuring directly by laser beam and without reflection the gap between the cooling rolls, and controlling the gap to control minimal pressure on the softened and heat-plastified sheet.

7 Claims, 2 Drawing Sheets

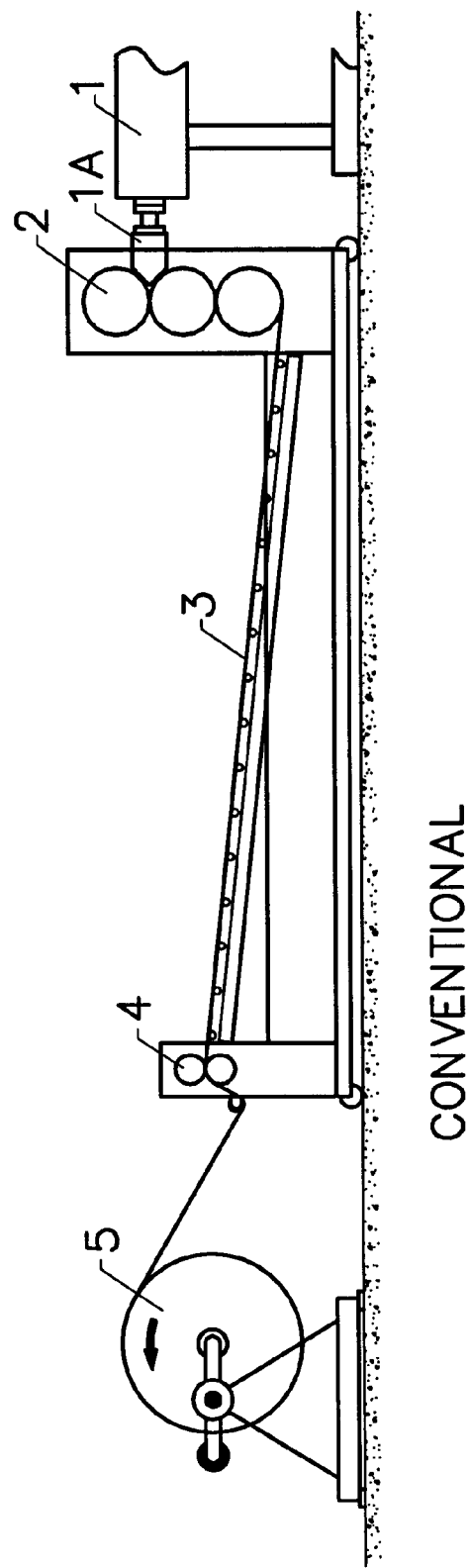
Fig. 1
CONVENTIONAL

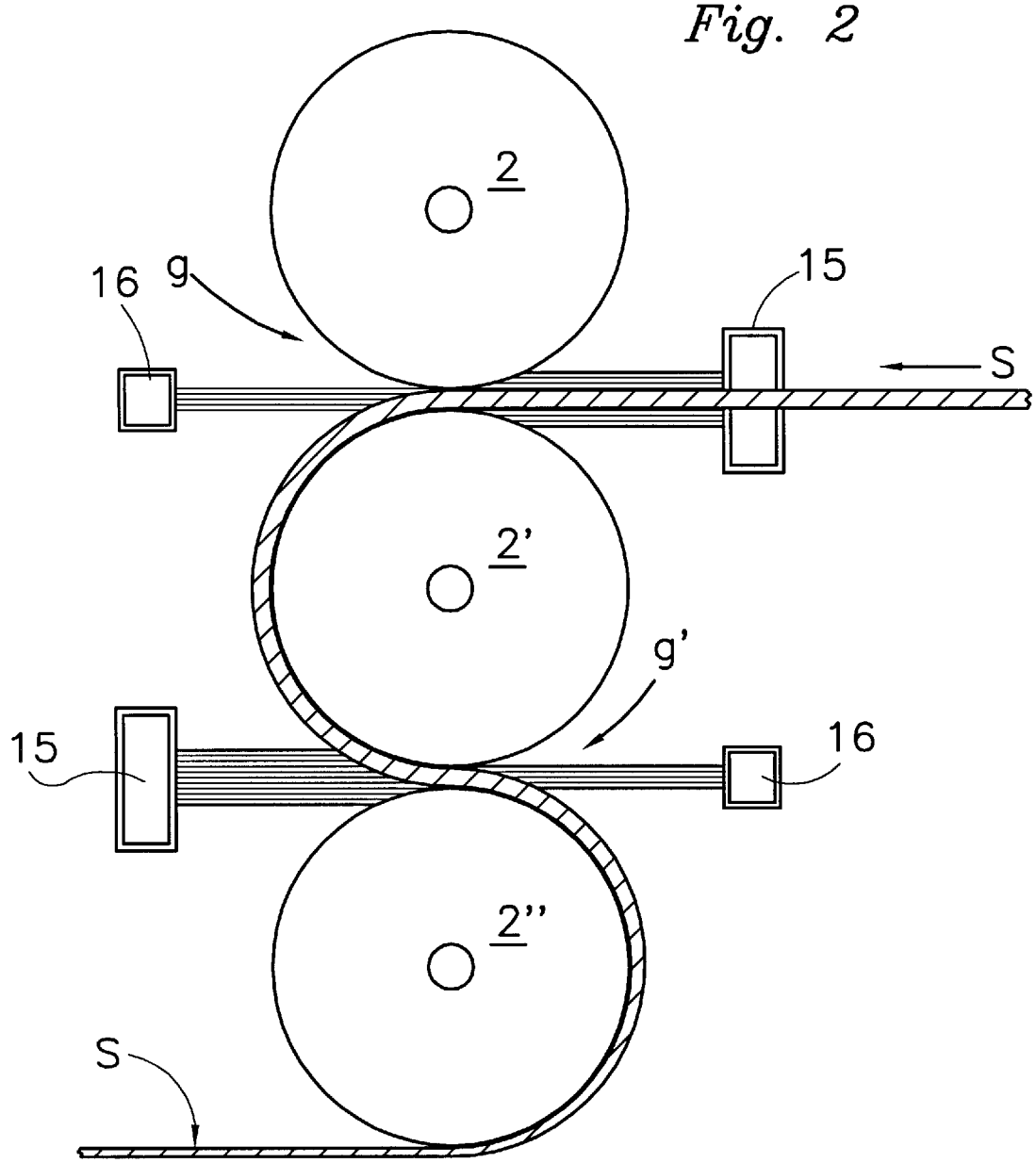

APPARATUS FOR MEASURING AND OF CONTROLLING THE GAP BETWEEN POLYMER SHEET COOLING ROLLS

FIELD OF THE INVENTION

This invention relates to apparatus for accurately and uniformly cooling a preformed polymeric sheet. It further relates to apparatus for extruding and cooling a preformed polymeric sheet wherein the gap between adjacent rolls is measured and controlled for accurately and gently cooling the polymeric sheet with minimum stress.

DESCRIPTION OF THE RELATED ART

Polymeric extruded or coextruded sheets are usually extruded out of a slit die of appropriate width, as indicated in the U.S. Pat. Nos. 3,918,865, 3,940,221, 3,959,431, 4,533,510 and 5,466,403, to Frank R. Nissel for example. The hot sheet is then cooled by passing it through a pair or a series of temperature-controlled rolls. Although various roll numbers and arrangements may be used, three rolls are often used, sometimes in planar alignment with each other. The gaps between the rolls are desired to be precisely adjusted according to the desired final sheet thickness. This precision is necessary for a variety of reasons, including elimination of air entrapment between the rolls, which causes adverse or uneven heat transfer or cooling. The rolls typically apply embossing to provide a high quality surface impression on the sheet.

Traditionally, the sheet die exit is horizontal and the sheet runs through a cooling roll stack at any angle, either upwardly or downwardly. Vertical, horizontal or various angled roll stacks may be used.

For various purposes, the art has made efforts from time to time to measure the gap distance between cooling rolls. Gauging the gap distance has been achieved mechanically through the use of feeler gauges. Unfortunately, feeler gauges lack the precision needed for maintaining optimal cooling and surface impression. They provide only a go/no go type reading without giving accurate quantitative measurements. They further tend to scratch the roll surfaces. Feeler gauges also pose the danger of being accidentally drawn into the rolls and permanently damaging them.

To avoid these dangers, methods have been introduced where indirect measurement of the gap is taken. This includes measuring the sheet material which passes between the rolls, measuring the distance between the mounting blocks used to support the rolls, and measuring reduced diameter barrel portions. These methods, however, do not and cannot account for actual differences in the diameter of the roll, caused by changes in temperature and other factors. An accurate way to measure the gap between the rolls would be to measure the gap directly, but the reported attempts have not succeeded.

Several devices which monitor a sheet are used to influence the thickness of the sheet product. For example, U.S. Pat. No. 3,809,907 which issued to Schuller et al on May 7, 1974, discloses a device for controlling a bank of viscous material that is formed on, and builds up in front of, the nip of a pair of spaced rolls. Specifically, the rolls are first maintained in close proximity such that the molten material applied to an entry side of the rolls forms a bank of hot material against and before passing through the rolls. The amount of molten steel accumulation is measured by a pair of laser emitters and detectors, located at or near the ends of the rolls. But the laser measures the amount of molten material that is banked up before it flows between the rolls, not the actual roll gap.

Turning now to the field of plastic sheets, extrusion dies with variable lip portions have been used to form polymeric sheets of varying widths and thickness. Once extruded through an adjustable lip die, the polymeric sheet is substantially at its desired thickness. However, there is a demand for cooling of a preformed polymeric sheet without excessively stressing the polymeric sheet product.

There is a need to provide an apparatus for extruding polymeric sheet materials with an extrusion die capable of pre-forming polymeric sheets of accurately predetermined thickness, and a cooling device having cooling rolls defining a gap of precisely known dimension through which the polymeric sheet passes for the purpose of cooling or embossing, wherein the rolls rapidly and uniformly cool the polymer while exerting only minimal pressure on the extruded sheet.

SUMMARY OF THE INVENTION

This invention includes an extruder and cooling rolls that have an adjustable gap through which a preformed polymeric sheet passes. The gap between the rolls is accurately measured and controlled to allow the rolls to exert only a minimal pressure on the polymeric sheet and to impart the best surface finish to the sheet while subjecting it to the lowest possible stress level.

BRIEF DESCRIPTION OF THE DRAWINGS

FIG. 1 shows a conventional plastic sheet extrusion line used for high speed production of sheet in rolls, and FIG. 2 is an end view of a three-roll stack of polymer sheet cooling rolls arranged for direct roll gap measurement in accordance with this invention.

DETAILED DESCRIPTION OF THE PREFERRED EMBODIMENT

Although the present invention will be hereinafter described in regard to specific embodiments thereof, these embodiments are provided merely for illustration. This invention is not limited to the specific details; its scope is defined in the appended claims.

Turning now to FIG. 1 of the drawings, showing a conventional sheet extrusion line, the number 1 is a conventional extruder that plasticizes and pumps the plastic material to die 1A that extrudes a sheet of finite width. 2 is a three roll sheet take-off also known colloquially as a calendar. It serves to cool the extruded sheet back to near room temperature. These three rolls are driven by a variable speed motor. 3 is an idler roll conveyor positioned to support the sheet while being finally cooled by ambient air. 4 is a set of pull rolls provided to maintain tension on the sheet going over the conveyor 3. These pull rolls are driven by a second variable speed motor.

5 is a roll winder producing rolls from the pull rolls 4 of finite length. An indexing two-position turret winder is shown because of its convenience, but any other single or multiple type of roll winder can be used.

Cooling and surface imprinting can be accomplished simultaneously using cooling rolls. The polymeric sheet is hot enough or warm enough to be susceptible to damage and deformation if not handled gently. For this reason, the sheet should be introduced to the cooling rolls promptly after leaving the die.

The rolls of the cooling roll stacks are generally made up of a plurality of cooling rolls, turning parallel on axes of rotation. In some cases three or more cooling rolls are used, as shown for example in FIG. 2. Each roll is designed to be a heat sink for transferring heat from the polymeric sheet during the cooling process, without changing the symmetry and thickness of the sheet. Some or each of the cooling rolls may also be provided with an embossing platen surface, which is also subject to the dangers earlier discussed.

Between at least two adjacent rolls, a gap is defined. Two such gaps are shown at "g" and "g" in FIG. 2. Each gap performs a vital role in the production cooling of high quality polymeric sheets.

In accordance with this invention each gap "g" is precisely maintained at a desired uniform distance from roll edge to roll edge, whereby the sheet has a width less than the width of the rolls. A laser light emitter 15 is provided at the upstream or downstream side of each roll gap, and projecting through each gap "g." A laser beam detector 16 is provided on the opposite side of each gap "g" for measuring the amount or extent of light passing through the gap. In each case the laser light passes through the roll gap itself outside the area covered by the sheet S. There is a laser on each edge of each roll, a total of four in FIG. 2. A sensor such as a computer or other device (not shown) is provided for comparing the measured light that passes through each gap to a control value corresponding to a gap distance. The comparing means may be further connected to a means for controlling the linear displacement of the rolls with respect to each other to achieve an accurately maintained gap between the rolls, and to report the measured value to the operator.

Each laser is preferably aimed so the laser light hits both roll surfaces 2, 2' and 2", and a portion of the laser light passes between the rolls and through the gap. This ensures accurate direct and non-reflective light measurement of the thickness of the gap itself.

This measurement system maybe used continuously throughout the extrusion cooling process. The gap distance may be adjusted when necessary, either manually or automatically in view of a laser measurement if desired, thereby maintaining the desired gap distance without damaging or reducing the thickness of the delicate polymeric sheet. Importantly, this allows for real-time adjustment due to fluctuations in the roll diameter caused by temperature fluctuations and other factors.

The rolls are preferably specifically and precisely set not to exert enough pressure to damage or to change substantially the thickness of the polymeric sheet. Preferably, the rolls are adjusted from time to time or continuously to maintain a gap which is preset to maintain precise contact with the polymeric sheet for cooling or also for imprinting the sheet surface with the desired pattern.

It is important to control the roll gap to a preset or precisely known dimension to impart the best surface finish to the sheet while developing the lowest possible stress level.

The polymer cooling roll arrangement of FIG. 2 may be used in cooling roll stacks having vertical, horizontal, or angular or other orientations. Preferably, a roll stack will often have three rolls arranged such that their axes of rotation are coplanar. However, many different combinations or arrangements may be used.

When the polymeric sheet leaves the cooling stack, it has been cooled sufficiently to its final form, and embossed if desired. Subsequently, it is introduced to a takeup spool 5 (FIG. 1), where it is rolled for storage or delivery.

The method of treatment of the sheet according to this invention includes the step of extruding the polymeric sheet to substantially its final thickness and then introducing it into and through the controlled dimension gaps between the cooling rolls. The controlled gap dimension is of primary importance and control. The roll pressure may vary between about 20 to 500 pounds per linear inch of roll width.

In a preferred form the gaps between each two adjacent rollers are automatically and continuously monitored by the laser gap monitor and continuously or periodically adjusted to a predetermined roll gap.

As described, the gap distance is desirably first measured by projecting a laser at and through the gap and directly without reflection to a beam detector or photosensor on the opposite side of the gap. A comparator connected to the detector then compares the received signal to a control signal which may or may not correspond to a desired gap distance. The comparator then communicates the results to a computer for linear adjustment of the rolls defining the gap distance. One or more rolls is then adjusted linearly, accordingly. This process is continued preferably throughout the polymer extrusion process, and therefore maintains exacting standards on the polymeric sheet thickness.

Knowledge by the operator of strictly controlled gap distances is critical to the consistent production of quality polymeric sheet material. If the roll gap is too large, or irregular in size or shape, air is occluded between the roll surface and the sheet, resulting in poor or uneven cooling and poor surface finish. On the other hand, if the roll gap is too small, the incoming material cannot pass uniformly completely through the gap and this results in accumulation of a bank of polymeric material, causing unacceptable surface imperfections and stress in the sheet and other defects. An insufficient roll gap also creates added pressure on the polymeric sheet, and may undesirably effect the thickness of even a sheet which has earlier been accurately formed to its proper and accurate specifications by the extrusion die.

In accordance with this invention the laser operates without roll reflection. Since the light passes through the tangential point of two rolls, there is no possibility of reflected light. In any case, the detector is opposite the light source from the rolls so that any reflection would not be detected.

The rolls are usually held closed by an adjustable pneumatic or hydraulic pressure system so that they can open up in case of extreme material pressure to avoid damage to the rolls.

The ability to maintain a precisely preset roll gap is most desirable to produce uniform stress free sheet. Direct roll gap measurement according to this invention is the only reliable means of achieving this.

what is claimed is:

1. An apparatus for extruding and cooling polymeric sheet materials, said apparatus comprising:

a polymer sheet extruder having heating means connected to a die aligned to produce along a machine direction initially softened and heat-plastified polymeric sheets of predetermined thickness;

a plurality of cooling rolls oriented along said machine direction and downstream of said heating means, a plurality of cooling roll supports constructed to provide a gap between said cooling rolls, feed means positioned for introducing said sheet into a portion of said gap, each said cooling roll having a longitudinal axis of rotation and being capable of cooling along said machine direction said heat-plastified polymeric sheet produced by said extruder, said feed means including opening forming means for limiting the width of said sheet and for providing at one or more roll corresponding portions an opening that is free of such sheet, displacement means connected to at least one of said cooling rolls, said displacement means being mounted for selective displacement of one of said cooling rolls with respect to another of said cooling rolls; and a laser source positioned and aimed to measure directly and without reflection, and while said sheet is processed through said gap, the thickness of said gap, said laser source being aimed in said machine direction and emitting a laser beam aimed and arranged to transmit a beam of laser light tangentially into and directly through said gap and between said cooling rolls at the opening where said rolls are free of such sheet, a corresponding laser beam detector positioned and aimed in line along said machine direction with said gap and in a position directly opposite to said laser source for non-reflectively reflectively measuring, while said sheet is processed through said gap, the amount of laser light passing directly through said gap;

means for comparing said measured value to a desired value corresponding to a, desired gap width; and a controller responsive to said measured value for controlling said gap distance through said selective linear roll displacement;

wherein said adjacent rolls are positioned at a controllable distance for passage of said softened and heat-plastified polymeric sheet to apply minimal stress level to said polymeric sheet while said rolls exert a cooling effect to cool and solidify the previously softened and heat-plastified polymeric sheet.

2. The apparatus of claim 1 wherein a plurality of gaps are present, each with a laser source and a laser detector, and wherein each said laser source emits a laser beam, and its corresponding laser source and its corresponding laser detector are located at opposite sides of said gap between said adjacent rolls.

3. The apparatus of claim 1 wherein said cooling rolls are arranged in a stack which is oriented in a vertical orientation.

4. The apparatus of claim 1 wherein said rolls are arranged in a cooling stack which is oriented in a horizontal position.

5. The apparatus of claim 1 wherein said rolls are arranged in a cooling stack which is angled between a horizontal and a vertical orientation.

6. The apparatus of claim 5, wherein said cooling stack comprises three cooling rolls.

7. The apparatus of claim 5, wherein said cooling stack comprises three cooling rolls, and said laser source and said corresponding laser detector are positioned adjacent two adjacent cooling rolls, and oriented physically to measure directly said gap therebetween.

* * * * *